United States Patent [19]
Stricker et al.

[11] Patent Number: 5,993,052
[45] Date of Patent: Nov. 30, 1999

[54] DEVICE FOR THE RELAXATION OF BULK ARTICLES CONTAINING DRAWN THERMOPLASTICS AND FOR THE SELECTIVE SOFTENING OF THERMOPLASTICS IN A MIXTURE FLOW FOR RECYCLING

[75] Inventors: Urban Stricker, Hilchenbach; Martin Siebert, Berlin; Klaus Stricker, Siegen, all of Germany

[73] Assignee: Urban Stricker, Hilchenbach, Germany

[21] Appl. No.: 08/894,242

[22] PCT Filed: Jan. 25, 1996

[86] PCT No.: PCT/EP96/00293

§ 371 Date: Jul. 25, 1997

§ 102(e) Date: Jul. 25, 1997

[87] PCT Pub. No.: WO96/22867

PCT Pub. Date: Aug. 1, 1996

[30] Foreign Application Priority Data

Jan. 26, 1995 [DE] Germany ............................ 195 02 352

[51] Int. Cl.⁶ ..................................................... B29B 13/08
[52] U.S. Cl. .............................................. 366/79; 366/144
[58] Field of Search .................................... 366/79, 80, 85, 366/81–84, 86–99, 144, 147, 318, 320; 426/174.4, 209.9; 99/DIG. 14; 264/472, 473, 474, 475, 476

[56] References Cited

U.S. PATENT DOCUMENTS

| | | |
|---|---|---|
| 3,231,387 | 1/1966 | Tsuchiya et al. ....................... 99/323.4 |
| 3,309,736 | 3/1967 | Rodenacker ............................ 366/144 |
| 3,883,624 | 5/1975 | McKenzie et al. . | |
| 4,003,554 | 1/1977 | Chauffoureaux ...................... 425/174.4 |
| 4,039,168 | 8/1977 | Caris et al. ............................... 366/147 |
| 4,265,922 | 5/1981 | Tsuchiya et al. ................... 99/DIG. 14 |
| 4,309,114 | 1/1982 | Klein et al. ................................ 366/79 |
| 4,658,891 | 4/1987 | Wurtz ...................................... 366/144 |
| 4,671,757 | 6/1987 | Volk, Jr. .................................. 366/145 |
| 5,114,648 | 5/1992 | Kuc, Sr. .................................... 366/79 |
| 5,145,694 | 9/1992 | Brams ...................................... 264/475 |

FOREIGN PATENT DOCUMENTS

| | | |
|---|---|---|
| 0 154 333 | 9/1985 | European Pat. Off. . |
| 0 469 466 | 5/1992 | European Pat. Off. . |
| 0 595 189 | 4/1994 | European Pat. Off. . |
| 2 337 734 | 5/1971 | France . |
| 1 906 278 | 11/1970 | Germany . |
| 29 32 446 A1 | 2/1981 | Germany . |
| 93 16 760 | 2/1990 | Germany . |
| 42 20 665 C2 | 5/1995 | Germany . |
| 0308170 | 12/1993 | Japan . |
| 6007762 | 1/1994 | Japan . |
| 6210633 | 8/1994 | Japan . |
| 680948 A5 | 12/1997 | Switzerland . |
| 1 313 203 | 6/1970 | United Kingdom . |
| 1 313 203 | 4/1973 | United Kingdom . |
| 1 458 312 | 12/1976 | United Kingdom . |
| WO 93/14915 | 8/1993 | WIPO . |
| WO 93/17852 | 9/1993 | WIPO . |
| WO 94/00241 | 1/1994 | WIPO . |

Primary Examiner—Tony G. Soohoo
Attorney, Agent, or Firm—Herbert Dubno

[57] ABSTRACT

A worm or screw conveyor for the thermal treatment of a bulk containing thermoplastics and which has an elongated housing along which the bulk material is conveyed by a worm or screw. The worm or screw has a certain peripheral diameter and is rotatable about the worm axis to displace the bulk material therealong and an infrared heater is located in the housing centrally of the peripheral diameter for directly exposing bulk material in the housing to infrared radiant energy to heat the bulk material.

14 Claims, 2 Drawing Sheets

DEVICE FOR THE RELAXATION OF BULK ARTICLES CONTAINING DRAWN THERMOPLASTICS AND FOR THE SELECTIVE SOFTENING OF THERMOPLASTICS IN A MIXTURE FLOW FOR RECYCLING

REFERENCE TO RELATED APPLICATIONS

This application is a national stage of PCT/EP 96/00293 filed Jan. 25, 1996 and, based in turn, upon German National application 19502352.8 filed Jan. 26, 1995 under the International Convention.

FIELD OF THE INVENTION

The invention relates to the design of devices by means of which bulk materials containing stretched thermoplastics can be thermally treated so that during the treatment the stretched thermoplastics run through the entire range of their relaxation/thermal reformation/shrinkage states. The relaxation of stretched thermoplastics can be advantageously used in the preparation of thermoplastics for recycling, e.g. by increasing the weight of the bulk material or for embrittlement.

BACKGROUND OF THE INVENTION

With these devices it is also possible to treat such mixtures containing different plastic material, wherein a certain kind of thermoplastic in the mixture can be selectively softened, and the mixture can subsequently be passed along in a softened and heated state to the following processing station.

From WO 93 14915 and the DE 42 20 665 processes are known wherein the relaxation of stretched thermoplastics for recycling purposes is performed so that within a mixed flow certain thermoplastics are selectively relaxed corresponding to type causing selectively targeted changes of their characteristics and making possible a subsequent automatic sorting. From WO 94/00241 and WO 93/17852 processes are known wherein in a mixed flow containing various plastic materials, certain kinds of thermoplastic are selectively softened and these are then automatically sorted in further process steps based on the changes made in their physical characteristics.

From GB-A1 313 203 a device is known wherein previously comminuted plastic foam is transported in individual particles on a vibrating surface. Infrared heaters mounted over the conveyor path, heat the conveyed goods, whereby these are brought into their relaxation range and thereby shrunk. The surface of the vibrating conveying device is cooled, in order to prevent an overheating of the surface due to infrared radiation, which would lead to the fusion of the particles of conveyed goods, and an adhesion of the fused particles, which could cause an interruption in the process. Besides the size of the particles to be treated, with this method the process duration is determined by the distance of the IR-radiation elements from the conveyor surface, by the installed cooling capacity and by the conveying speed resulting therefrom. Due to the specific characteristics of a vibratory conveyor, especially an inherent frequency conveyor, combined with the possible overall size of the installation, the transport capacity is limited. A further drawback of this method is that particles to be treated remain with their bottom side on the conveying surface, and these areas are not exposed to a direct IR-radiation. This leads either to an incomplete relaxation of the particles or to a prolongation of the process.

U.S. Pat. No. 3,883,624 describes a process wherein a polystyrene foam, after an introductory comminution, is guided on a metallic conveyor belt through a thermal treatment, whereby the foam shrinks and partially fuses into one layer, becomes brittle after cooling and subsequently is again comminuted into plastifiable particles. Due to the fusion of the polystyrene this process is not suitable for the selective heat treatment of particles in a mixed flow containing also other plastic materials. All foreign matter present in the recycling practice have a negative influence on the process results.

Multiple technical variations of screw conveyors are known which solve the problem of the heat treatment.

OBJECT OF THE INVENTION

It is the object of the present invention to make possible a selective relaxation, or the selective softening of thermoplastics in a mixture with other types of plastic material, by means of machines in a continuous process, so that a targeted and quick heating of plastic particles can take place while keeping as strictly as possible within certain temperature ranges.

SUMMARY OF THE INVENTION

According to the invention, this object is achieved by using the principle of the screw conveyor for the transport of the mixed flow of bulk material. The heat input for the heating of the conveyed goods takes place advantageously through heat radiation during the transport in the screw conveyor or the screw-tube conveyor.

Specific advantages of the screw conveyor of the invention are:

A. Because the conveying is based on thrust, a turning of the material takes generally place at least in the contact area between the conveyed material and the thrust-generating screw flank. This turning effect is particularly intense in screw-tube conveyors, since here in addition the trough wall is also moved. Because of the turning a uniform tempering of the conveyed material takes place. The conveying behavior of screw conveyors has a particularly positive effect in cases of relaxation, since by the change in density the already relaxed particles are moved downwardly thereby pushing the particles in need of relaxation up into range of direct IR B. radiation. By a zoned layout of the construction of the screw conveyor, process steps preceding or following the actual heating process can be connected into one unit. In this way for instance a very precise feeding of the tempering segment in all tempering processes can be achieved. Where vibratory conveyors are employed this is made possible for instance by providing a preceding star valve (see GB-A 1 313 203).

BRIEF DESCRIPTION OF THE DRAWING

The above and other objects, features, and advantages will become more readily apparent from the following description, reference being made to the accompanying drawing in which.

SPECIFIC DESCRIPTION

FIGS. 1a to 1e show in cross section a variety of arrangements for the infrared radiators (IR-radiators) with respect to the screw. In the figures the screw is a standard screw. Other screw shapes, such as a spiral band, a paddle screw or the like, which partially also offer the advantage that the conveyed material is less shielded towards the IR-radiation, can also be used.

Figure 1A:
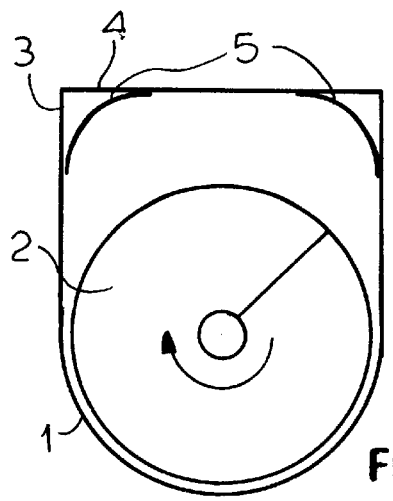
FIG. 1a is a diagrammatic transverse cross section showing a screw arrangement in which the infrared radiators are located along upper portions of the conveyor trough or housing.

In FIG. 1a a troughed screw is represented. The surface IR-radiators 5 of curved configuration are mounted in the corners between the upper part of the screw trough 3 and the cover 4, which as a rule can be removable. The walls of the screw trough and the screw itself are suitably coated with an IR-reflecting layer or are made of an IR-reflecting material, such as aluminum, in order to increase the proportion of effective IR-radiation within the bulk material.

Figure 1B:
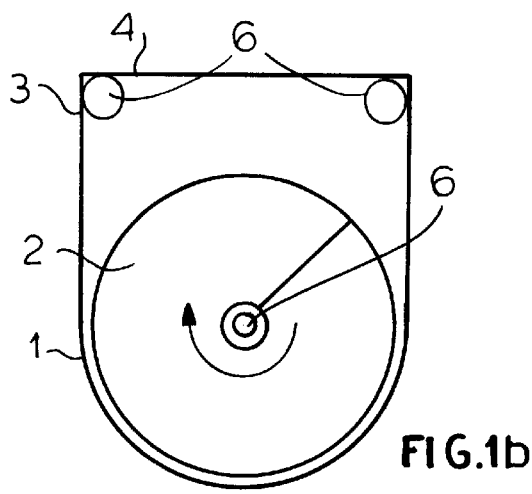
FIG. 1b is a diagrammatic cross sectional view similar to FIG. 1a having a different arrangement of the infrared radiators.

In FIG. 1b rod-like IR-radiating elements 6 are mounted in the same locations as the radiators in FIG. 1a. In this Figure it is shown that rod-shaped IR-radiators 6 can be, for instance also mounted inside the screw shaft of the screw 2, as long as the shaft is hollow and corresponding openings are provided for the delivery of the IR-radiation to the exterior, so that the conveyed material is exposed to the IR-radiation.

Figure 1C:
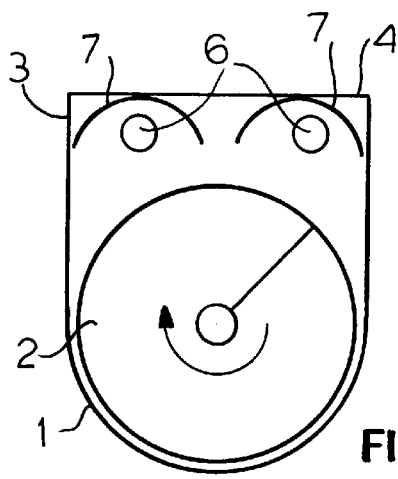
FIG. 1c is another diagrammatic cross sectional view in which the infrared radiators have reflectors.

In FIG. 1c the IR-radiators 6 are mounted at the focal points of reflectors 7, in order to optimally focus the emitted radiation onto the conveyed goods and to keep the screw shaft as much as possible outside the radiation range.

Figure 1D:
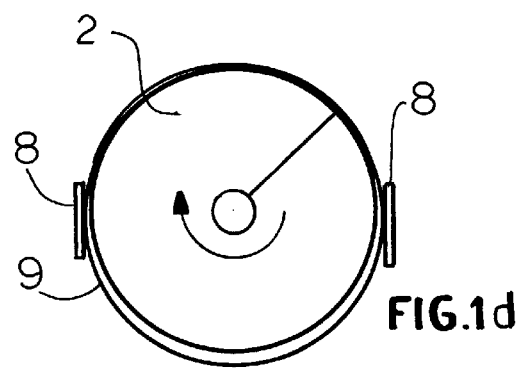
FIG. 1d is a diagrammatic cross sectional view of a worm conveyor of the tube type having windows through which the infrared radiators act upon the bulk material which is conveyed.

In FIG. 1d a tubular shell 9 is provided as a screw housing. The shell has windows made for instance of transparent quartz glass, behind which the IR-radiators 8 are mounted. In a double-wall construction, the windows can be traversed by a cooling medium, which is also IR-permeable (for instance air), in order to prevent an excessive heating of the windows. The windows can be mounted below or above the level of the conveyed goods.

Figure 1E:
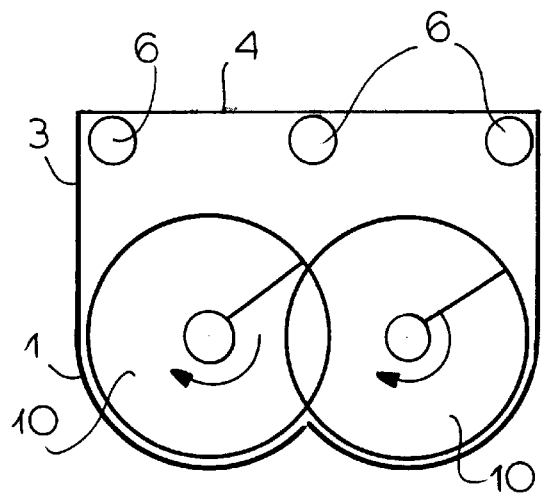
FIG. 1e is a diagrammatic cross sectional view similar to FIG. 1b but of the double worm or double screw type.

FIG. 1e shows a double screw arrangement with mating screws 10 as the conveying elements. Here the IR-radiators 6 are mounted below the cover 4 of the screw trough.

Figure 1F:
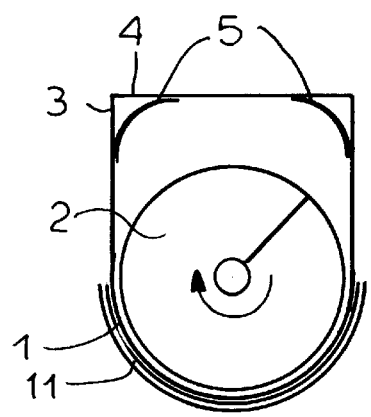
FIG. 1f is a cross sectional view similar to FIG. 1a showing still another embodiment of the screw conveyor using infrared radiant heaters.

In FIG. 1f a heating coil 11 is shown as a supplemental element for the heating of the conveyed goods. The heating coil 11 can be heated, for instance electrically, or by steam, oil, water or other heating media. The heating coil 11 can cover parts of the screw housing 1 or of the tubular shell 9, as shown in FIG. 1d. The heat energy for the heating coil 11 can also be partially won by using the waste heat from the cooling zones of further process steps. A heat coupling with other adjacent installations also may be used.

Figure 2:
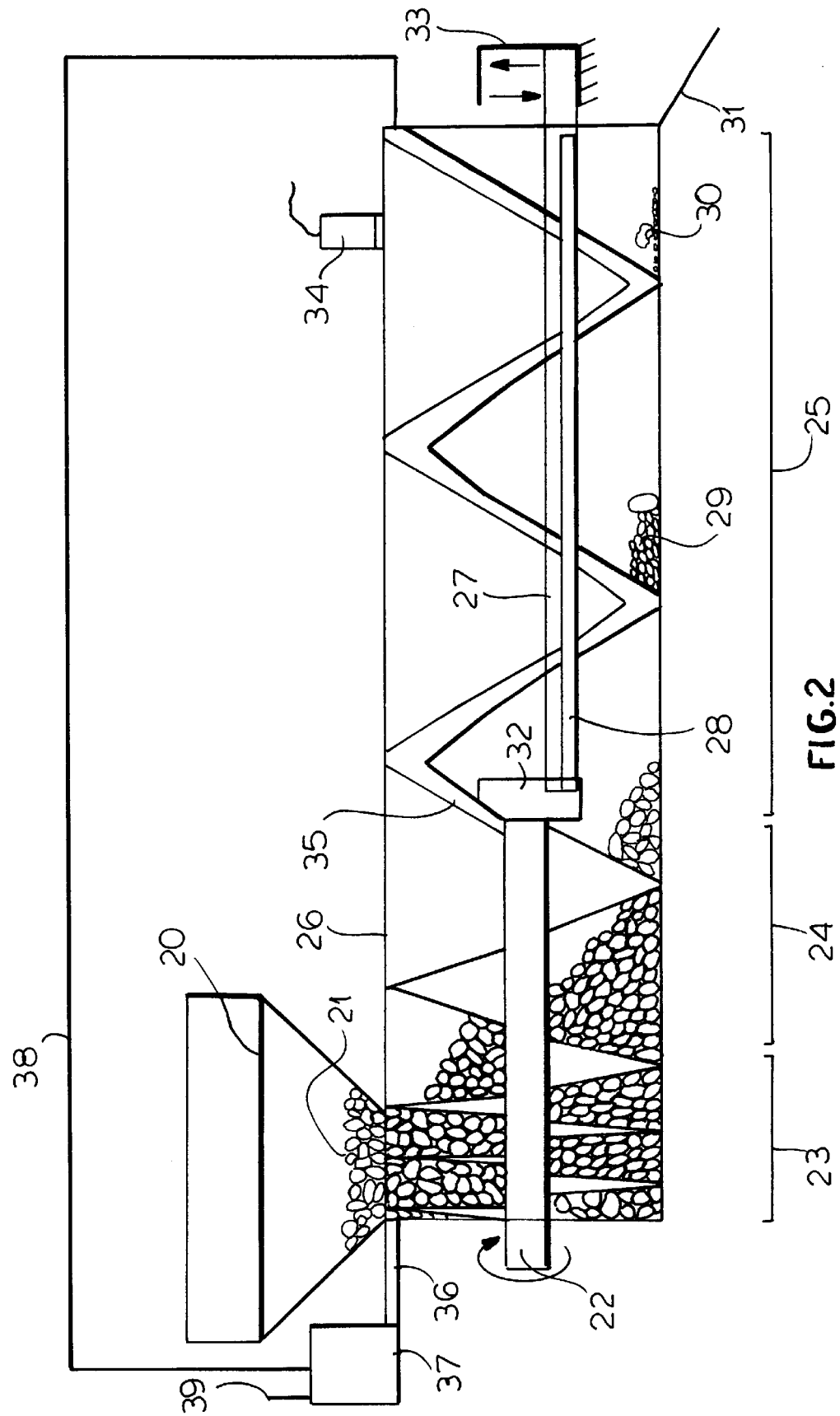
FIG. 2 is a diagrammatic axial cross section through another screw arrangement according to the invention.

According to the invention, a heating section based on screw conveyors can also be coupled on the incoming side with a so-called feeding and dosage zone of the same screw. From a simple storage facility (silo or the like) the material is brought via a funnel first to a screw designed as a standard screw. The feeding area is designed so with respect to the thread volume, that the exact amount of material desired as filling ratio in the further course of the screw is received in the heating zone. In the metering zone following the feeding zone the screw thread is widened so that at the beginning of the heating zone the desired filling ratio results. FIG. 2 shows this principle in a screw conveyer.

It is also possible to use a screw-tube conveyer, whereby the feeding of the material is done axially. The already comminuted material to be treated is introduced into the material feeder 20. A comminution can also take place immediately after the material feed 20 and before the inlet zone, in a slowly moving comminuting device with a subsequent buffer spare. From there the continued material reaches the inlet zone of the screw mounted on the driving shaft 22.

In the present example, the driving shaft 22 drives the screw with three different functional zones with the same RPM. Through the various screw constructions and pitches 23, 24, 25, different conveying speeds are reached in the individual zones according to each area in which the material is located, and thereby different tasks are performed.

From the inlet zone 23 the material reaches the metering zone 24, wherein due to the corresponding designs of the screw with reference to pitch, geometry and the RPM of the screw shaft it is insured that only strictly limited amounts of material are pushed on to the tempering zone 25 and the filling ratio φ is set so that the below-described installation support 27 is kept free of material in any case. This is achieved with a high degree of certainty when φ=0.02–0.15.

In the heating zone 25, which here is selected as a spiral band type of screw, an installation support 27 for the infrared radiators 28 is provided, in order to expose the material to a large extent to IR-radiation without shielding by screw elements and to limit the heat exposure of the conveyor elements due to the smaller surface of the conveyor elements. As indicated here, the support 27 can be embedded only on one side in the fixed support 33, but depending on length and construction, it can also be supported at both ends, as for instance shown here with support 32 following the run of the shaft 22, or also multiply supported. The height of the support 27 above the material, or deepest point of the tubular screw shell 26 is adjustable, in order to adjust the intensity setting of the IR-radiation emitted by the IR-radiators 28 correspondingly to the material heated. This setting with respect to the material to be treated can be done once, at the starting of the installation, or can continuously be varied by means of a contactless measuring temperature sensor 34, mounted for instance outside of the tubular screw shell 26, which measures the temperature of the material via a window, or also for instance at the support 27.

Using the measured signal it is possible to influence the height of the support or any other measured value useful for regulating the effective IR-radiation in the material (such as radiator temperature, number of working radiators, etc.), so that the heating corresponds to preset values. The feeding lines for the installations on the support are for instance guided by a rigid or flexible guide from the support to the machine frame.

The material to be treated is transported through the heating zone 25 and thereby runs through the treatment, schematically represented as partially treated material with foreign matter 29 and extensively treated material with foreign matter 30. Over an outlet slide 31 the material can be for instance transmitted to the following process step. A variation of the spiral band 35 can consist in that the band is made of a hollow material, through which a heating medium can run in cycles, in order to heat the screw itself in a stable way, and as an additional effect, to warm also the material to be treated, or in certain cases to cool it. The same possibilities apply to the screw parts in the metering zone 24 and in the inlet area 23.

The representation in FIG. 2 with a closed tubular screw shell 26 also advantageously offers the possibility of evacuating the possible emissions (dust, smells) together with the heated air resulting from the treatment of the material via the material feeder 20 and to retain the contaminants with filters. They can be evacuated as shown in the screw inlet area 36 and delivered to a conveying and filtering unit 37. Thereby the air can be optimally filtered and released into the atmosphere at 39, or can be largely recycled through an air circulation duct to be used again in the heating of the material in the heating zone 25, thereby contributing to an economical energy use. Thereby it is possible to advantageously use the heat carried along by suction in the feeding zone 20, as well as in the inlet zone 23 and metering zone 24 for the preliminary heating of the material.

For special applications and for the preparation of the sorting task, from the process described in WO 93/14915 and the DE 42 20 665 (for instance for the relaxation and sorting of foam materials), corresponding devices can be coupled according to the invention with an additional cooling zone, optionally on the same level in the same conveying element.

We claim:

1. An apparatus for the thermal treatment of a bulk material containing thermoplastics, comprising:
   an elongated housing along which a bulk material containing thermoplastics is conveyed;
   a worm having a peripheral diameter and extending in said elongated housing and rotatable about a worm axis therein to displace said bulk material therealong; and
   an infrared radiant heater in said housing located centrally of said peripheral diameter for directly exposing bulk material displaced in said housing to radiant energy from said heater to heat said bulk material.

2. The apparatus defined in claim 1 wherein said housing, said axis and said heater are generally horizontal, said heater being adjustable as to a height thereof in said housing.

3. The apparatus defined in claim 2, further comprising a support for said heater, a fixed member receiving said support at one end thereof, and a member rotatable with said worm receiving said support at an opposite end thereof.

4. The apparatus defined in claim 1 wherein said worm is subdivided along a length thereof into three functionally different zones with said worm having configurations and pitches differing from zone to zone to generate different displacement speeds of the bulk material therein and with the bulk material having different filling ratios in said zones.

5. The apparatus defined in claim 1, further comprising means for controlling intensity of infrared radiation emitted by said heater.

6. The apparatus defined in claim 1 wherein said worm and walls of said housing facing said bulk material of infrared reflecting.

7. The apparatus defined in claim 6 wherein said worm and said walls of said housing are coated with an infrared-reflecting substance.

8. The apparatus defined in claim 6 wherein said worm and said walls of said housing are composed of an infrared-reflecting substance.

9. The apparatus defined in claim 1 wherein said worm and said housing have a filling ratio for said bulk material in a region of said heater between substantially 0.02 and 0.15.

10. The apparatus defined in claim 1 wherein said heater is an infrared-radiating rod.

11. The apparatus defined in claim 1 wherein said worm comprises a tube and a helical strip on an interior wall of said tube and forming flights of the worm for displacing the bulk material.

12. The apparatus defined in claim 1, further comprising means for evacuating air containing substances released from said bulk material from said housing, and filtering the substances released from the bulk material from the air.

13. The apparatus defined in claim 12, further comprising the step of discharging the air from which said substances have been filtered into the atmosphere.

14. The apparatus defined in claim 12, further comprising the step of recirculating the air from which said substances have been filtered to said housing.

* * * * *